Figure 1:
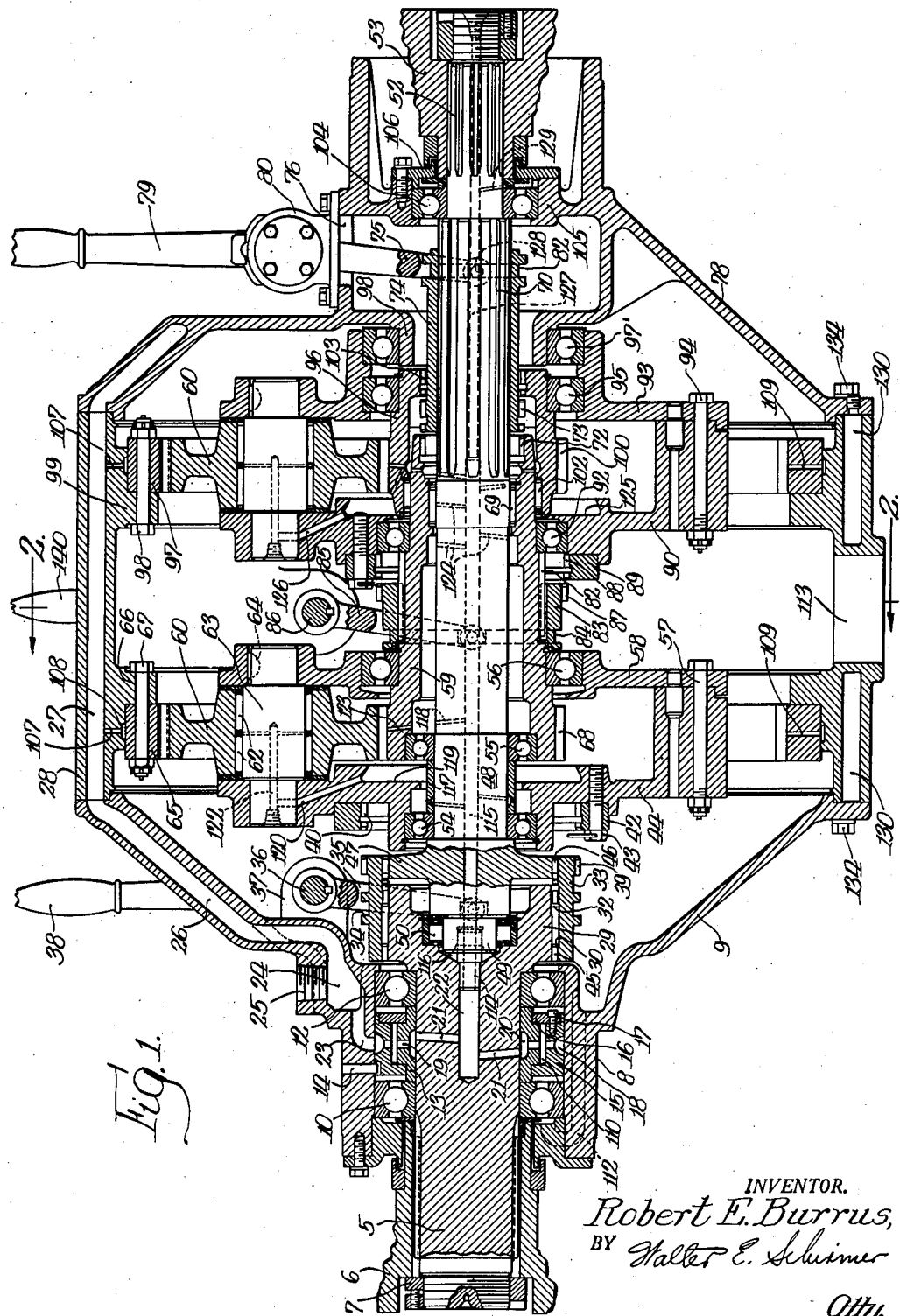

June 14, 1949.　　　R. E. BURRUS　　　2,472,788
STEP-UP GEARING

Filed May 25, 1945　　　　　　　　　2 Sheets-Sheet 1

INVENTOR.
Robert E. Burrus,
BY Walter E. Schwimer
Atty.

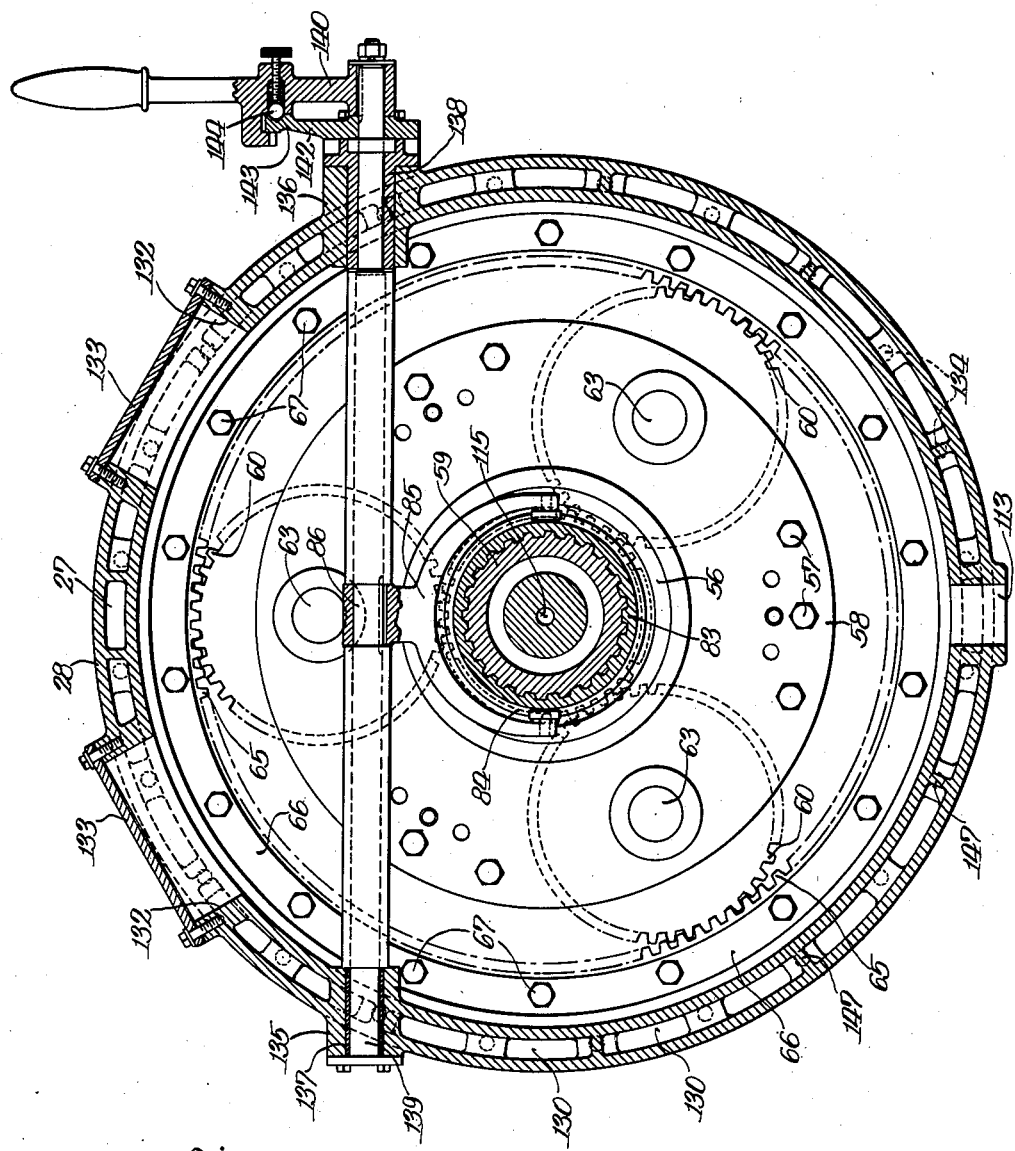

Patented June 14, 1949

2,472,788

UNITED STATES PATENT OFFICE 2,472,788

STEP-UP GEARING

Robert E. Burrus, Buchanan, Mich., assignor to Clark Equipment Company, Buchanan, Mich., a corporation of Michigan Application May 25, 1945, Serial No. 595,781

6 Claims. (Cl. 74—750)

This invention relates to step-up gearing, and more particularly is concerned with the provision of step-up gearing for use in connection with test work involving dynamometers and the like where various gear ratios may be desired between the input dynamometer, the unit being tested, and the absorption dynamometer.

The present invention concerns itself particularly with a gear box of the double planetary type having means for selectively providing direct drive therethrough or through either one or both planetary sets of gearing interposed in the drive between the input shaft and the output shaft.

One of the features of the present invention is to provide a construction of this type which is simple in operation and in which the selection of the various speed ratios can be readily made within the device itself.

Another object of the present invention is to provide a construction of this type in which the entire housing containing the gearing is water cooled to insure proper operation of the mechanism under high torque loads without excessive overheating of the bearings or the like.

Still another object is to provide a construction of this type in which lubrication of all the bearings, gears, sliding clutches, and other rolling parts is accomplished from a single source of lubricant supply carried within the housing and arranged for distribution from a common point.

The unit is designed so that it can be driven in either direction of rotation, and it can also be reversely driven to provide reduction gearing instead of step-up gearing. Also, none of the gears rotate in the unit except when power is transmitted therethrough.

Other objects and advantages, such as the provision of a construction which is compact in size and can be readily mounted in position, will be more apparent from the following detail description which, taken in conjunction with the accompanying drawings, will disclose to those skilled in the art the particular construction and operation of a preferred form of the present invention.

In the drawings:

Figure 1 is a vertical sectional view through a gear box embodying the present invention; and Figure 2 is a sectional view, taken substantially on line 2—2 of Figure 1, illustrating in detail the housing construction.

Referring now in detail to the drawings, there is provided an input shaft 5 which has a splined end adapted to receive the companion flange 6 of a coupling for connecting it to a driving source. The flange 6 is retained in position by the usual lock nut 7 carried on the reduced threaded end of the shaft 5. The shaft 5 is supported for rotation within a bearing portion 8 of one end plate 9 of the housing by means of ball bearing assemblies 10 and 12, these bearing assemblies being spaced apart by an inner spacer member 13 which is rotatable with the shaft and which includes an outer bushing member 15 keyed by dowel 14 against rotation and secured about the member 13 by means of the end washer 16 and screw 17. The bushing member 15 is provided with an external annular groove 18 communicating through the radial port 19 with an inner annular groove 20 formed in the spacer 13 and in turn communicating through radial ports 21 formed in the shaft 5 with the axial bore 22 formed in this shaft. The annular groove 18 in turn communicates with the passageway 23 leading into an oil reservoir 24 adapted to be filled with oil through the inlet opening 25, this being formed in a cored out portion of the end plate 9 of the housing for the gearing. A suitable passageway 26 formed in a portion of the end plate 9 communicates with the transverse passageway 27 forming the center portion of the housing for a purpose to be described hereinafter.

The inner end of the shaft is provided with an enlarged portion 29 having external teeth 32. Mounted about this enlarged portion is a clutch sleeve member 33 having a yoke collar 34 adapted to receive the shifter yoke 35 carried by transverse shaft 36 journaled in suitable bosses 37 formed in the end plate and controlled by the shift lever 38 externally of the housing. Shifting of the lever 38 rotates the shaft 36 and because of the keyed connection of this shaft with the shifter yoke 35, operates to effect axial shifting of the sleeve 33. The sleeve 33 carries at its inner end the external clutch teeth 39 and when shifted axially to the right as viewed in Figure 1, is adapted to have meshing engagement with the internal clutch teeth 40 of a member 42 bolted or otherwise secured as by studs 43 to the planetary gear spider member 44 and internal clutch teeth 45 of clutch sleeve 33 mesh with external teeth 32 of shaft 5. When in the position shown in Figure 1, the sleeve 33 is coupled by means of the intermediate internal teeth thereof to the enlarged portion of shaft 5 and provides a direct coupling through its internal teeth 46 to the flanged portion 47 of a shaft member 48. The shaft member 48 outwardly of the flange portion 47 is provided with a reduced portion 49 journalled as by means of roller bearings 50 within the recessed end of shaft 5. This provides a direct clutching connection when the sleeve is in the position shown in Figure 1 between the shaft 5 and the shaft 48. The shaft 48 at its opposite end is provided with a reduced splined portion 52 receiving the hub portion 53 of a coupling member adapted to couple this shaft to the absorption dynamometer. The hub 53 is held in position by means of a suitable lock nut or the like. Thus, a direct driving connection between the shaft 5 and the output shaft 48 is provided when the clutch sleeve is in the position shown.

The planetary spider 44 is journalled upon the shaft 48 by means of the ball bearing assembly 54, the axially spaced bearing assembly 55, and the bearing assembly 56. The spider 44 consists of two pieces bolted together as by means of the thru bolts 57, the plate member 58 of this spider being journalled on the bearing assembly 56 which in turn is journalled on the sun gear sleeve portion 59. The pinion carrier or spider 44 is provided around its periphery with three pinion gears 60, each of these gears being mounted through roller bearings 62 upon a shaft 63 having reduced ends carried in suitable boss portions of the spider members 44 and 58, the shaft being keyed as at 64 against rotation. The three pinions 60 have external gear teeth adapted to mesh with the internal teeth of ring gear 65 which is secured in position against the internal radial flange 66 of the housing 28 by means of the bolts 67. The pinion gears 60 also are in constant meshing engagement with the gear teeth 68 of the sun gear sleeve 59 whereby when the clutch sleeve 33 is shifted into engagement with teeth 40, the pinion spider is rotated and the pinion gears consequently drive the sun gear 59 at a higher speed. It will be noted that the sun gear is supported for rotation by the bearing assembly 55 and at its opposite end is journalled on the shaft 48 by means of the roller bearing assembly 69. At this end of the sleeve 59, the sleeve is axially extended to overly the splined portion 70 of shaft 48 and is provided with internal teeth 72 adapted to be engaged by the clutch teeth 73 of a second sliding clutch sleeve 74 mounted on the splined portion 70 of shaft 48. When the sleeve 74 is shifted to the left from the position shown in Figure 1, the teeth 73 and 72 are moved into meshing engagement and consequently the sun gear 59 then drives the shaft 48 through the splined connection of sleeve 70, thereby driving the output shaft at a speed determined by the ratito of the pinion gears, sun gear and ring gear 65. Shifting of the sleeve 74 is provided by means of the shifter yoke 75 extending outwardly through an opening 76 in the end plate 78 of housing 28, a suitable shift lever 79 being mounted for rotation on the bracket 80 and controlling the operation of the shifter yoke 75 which engages in the shift collar 82 of the sleeve 74 through sliding pads 128.

It will be noted that the sun gear sleeve 59 is provided intermediate its ends with the external splines 82 upon which is mounted a sliding clutch sleeve 83 having the clutch collar 84 engaged by the shifter fork 85 which in turn is mounted upon shaft 86 for shifting movement. The clutch sleeve 83 is also provided with external clutch teeth 87 adapted, when the sleeve is shifted to the right from the position shown in Figure 1, to mesh with the internal clutch teeth 88 of the ring member 89 secured to the side of the planet spider 90. The spider 90 is mounted at one side by means of ball bearings 92 upon the sun gear sleeve 59, and the opposite spider member 93 which is bolted to the spider member 90 by means of the bolts 94 is mounted by means of suitable bearings 95 upon the sun gear member 96 and by bearings 97' upon an inner flanged portion 98 of the end plate 78. When the planet spider 90 is clutched to the sun gear sleeve 59 through the clutch sleeve 83, it is driven at a higher rate of speed than the spider 44 through the first planetary reduction, and in turn is adapted to drive the sun gear member 96 through pinion members 60 corresponding to the members 60 of the first planetary step-up mounted in the same manner within the planet spider. The pinion members 60 have meshing engagement with the internal teeth of ring gear 97 secured by bolts 98 to the flange 99 of housing 28, and at their inner periphery engage the gear teeth 100 of the sun gear 96 for driving this sun gear. The sun gear 96 is rotatably supported relative the sun gear 59 and shaft 48 by means of the roller bearing assembly 102 and the bearing assembly 95. Internal clutch teeth 103 on the sun gear member 96 are adapted to be engaged by the clutch teeth 73 of clutch sleeve 74 when this sleeve is shifted to the right from the neutral position shown in Figure 1, whereby the sun gear 96 drives the shaft 48 at a very much increased rate of speed, thus providing for a double planetary step-up in speed from the drive shaft 5 to the output shaft 48.

The output shaft 48 is journalled intermediate the splined portions 52 and 70 upon the bearing assembly 104 which, in turn, is held in position by retaining flange 105 in the nose portion of the end plate 78 and by a suitable seal assembly indicated generally at 106.

Considering now the lubrication of the construction shown in Figures 1 and 2, it has been previously stated that lubricant is introduced through the opening 25 into the lubricant reservoir 24. Preferably this lubricant is introduced under sufficient pressure to force it up through passageway 26 into the longitudinal passageway 27 at the upper portion of housing 28. From the passageway 27 lubricant passes through openings 107 into an angular groove 108 surrounding the periphery of the ring gears 65 and 97. At substantially spaced points the ring gears 65 and 97 are provided with radial ports 109 shown in Figure 1 whereby this oil under pressure is forced inwardly to the internal gear teeth of the ring gear, whence the oil is picked up by the pinion gears 60 and in turn transferred through these gears to the sun gears 68 and 100. This provides for adequate lubrication of the gear members themselves.

Lubricant is also forced from the reservoir or chamber 24 through passageway 23 and annular groove 18 into ports 21 leading to the central axial bore 22 of the shaft 5. A certain portion of this lubricant passes outwardly through the longitudinal ports 110 and past the relatively movable surfaces of members 13 and 15 to lubricate bearings 10 and 12. Excess lubricant from bearing 10 is conducted through the cored passageway 112 out into the interior of the gear housing from whence it is removed through the sump 113 located at the bottom of the housing. An additional portion of this lubricant which is transmitted into the passageway 22 is transmitted therefrom through the sleeve 114 fixed in this passageway and centering in a corresponding passageway 115 in shaft 48 into an internal axial passage in shaft 48. A certain portion of the leakage of this lubricant passes out through the opening 116 between the reduced end 49 of shaft 48 and the recessed end of shaft 5 to lubricate bearings 50, and after passing through the bearings 50 is transmitted radially by centrifugal force to lubricate the internal teeth of sliding clutch 33. A radial passageway is also provided from the axial passageway 115 in shaft 48 to the spacer member 117 between bearings 54 and 55 from which oil lubricates bearings 54 through radial ports in sleeve 117. Bearing 55 is lubricated through the radial port 118 and after passing through bearing 55, this oil is centrifugally collected along the surface 119 of spider member 44, thence passing radially through the opening 120 and through the axial passage 122 in the shaft member 63 and radial ports therein for lubricating the roller bearing 62. The sun gear sleeve 59 is also provided with a radial port 123 for lubricating the sun gear teeth and also providing for lubrication of bearing 56.

Additional radial ports in shaft 48, communicating with the center feed port 115, indicated at 124 supply lubricant to the interior of the sun gear sleeve, and also to the roller bearing assembly 69 and to the internal teeth 72 of the sun gear sleeve. It will be noted that additional ports are directed radially through the overhanging end of the sun gear sleeve to provide for lubrication of bearings 102 and of the sun gear teeth of sun gear 96. A certain portion of this lubricant also passes along the surface 125 of spider member 90 and through passageway 126 for lubricating the roller bearings of the second series of planet gears 60 carried by the spider member 90. Bearings 95 and 97' are lubricated through the sun gear member 96, lubricant being forced axially at the points of meshing engagement of the pinion gears 60 with the sun gear 100 to direct oil to the bearings 95 and 97'.

The passageway 115 is reduced throughout the splined portion 70 of shaft 48, as indicated at 127, with a suitable radial port 129 which lubricates the bearing assembly 104. It will thus be seen that all of the bearings, sliding clutch parts, and gears of the assembly are adequately lubricated from a single pressure lubricant source.

Considering Figure 2 in detail, it will be noted that the housing member 28 is cored out to provide a plurality of interconnected water chambers 130 which are connected through suitable inlet and outlet connections (not shown) so that water is circulated throughout the entire annular surface of the housing 28 to provide for proper cooling thereof. Two inspection or hand openings are provided in this housing at 132, each of which is covered by a suitable cover plate 133 to provide for inspection of the gear assembly and for certain assembly operations in constructing the mechanism. The end plates 9 and 78 are secured to opposite ends of the annular housing 28 by means of suitable studs or thru bolts indicated at 134 in Figure 1.

The housing 28 is also provided at opposite sides thereof with boss portions 135 and 136, respectively, which are bored to receive suitable bushings 137 and 138 for rotatably securing the operating shaft 86 therein which extends transversely therebetween, and is connected at its outer end with a shift lever member 140 which, when rotated, operates to rotate the shaft 86.

Keyed to the shaft 86 intermediate its ends is the shifter fork member 85, this keyed connection providing for oscillation of the shifter fork 85 upon rotation of the shift lever 140.

Carried by the bushing 138 is a bracket member 142 having spaced detents 143 formed therein adapted to be engaged by the ball member 144 carried in the shift lever 140, whereby its shifted position may be determined as it is shifted from neutral to clutch engaging position.

Each of the shift levers 38 and 79 is similarly arranged for operation with suitable locking type detent means to determine its neutral and shifted position, the shaft 36 of lever 38 extending transversely across end plate 9, while the shaft for shift lever 79 is journalled within the bracket 80 mounted on top of the opening 76.

It will be noted from Figure 2 that the passageways 130 for conduction of fluid coolant around the housing 28 are staggered and divided by partition members 147 so that the water introduced adjacent the top of the housing at one side of the passageway 27 circulates back and forth axially of the housing as it moves circumferentially therearound until it finally reaches the outlet opening located on the opposite side of the passageway 27 adjacent the top of the housing. This provides for full contact of the coolant with the walls of the housing to insure rapid heat dissipation therethrough.

It is, therefore, believed apparent that I have provided a novel assembly of step-up gearing, whereby a direct drive may be produced through the gearing, a first planetary step-up ratio may be provided by shifting of clutch member 33 to the right and shifting of clutch member 74 to the left. This provides for drive from shaft 5 through planetary spider 44 to sun gear 68, and thence through sun gear sleeve 59 and clutch 74 to shaft 48. When it is desired to use both planetary step-ups, clutch member 33 is shifted to the right, clutch member 83 is shifted to the right, and clutch member 74 is shifted to the right. In this position, the drive is from shaft 5 to the first planetary step-up into sun gear 59, and from this sun gear to the second planetary step-up to clutch member 83 and from this planetary step-up to sun gear 96. From sun gear 96 the drive is transmitted to shaft 48 through the clutch member 74.

In direct drive, clutch members 83 and 74 are shifted to neutral position and clutch member 33 is shifted to the position shown in Figure 1.

While I am aware that various changes may be made in certain details of the assembly herein shown, I do not intended to be limited to the exact details herein shown and described, but only insofar as defined by the scope and spirit of the appended claims.

I claim:

1. In step-up gearing, a power input shaft, a power output shaft, a pair of axially spaced sun gears rotatably mounted about said output shaft and having axially spaced internal clutch teeth radially encircling said output shaft, a first planetary gear mechanism for one of said sun gears, a second planetary gear mechanism for the other of said sun gears, clutch means for directly coupling said shafts together or for coupling said input shaft to said first planetary mechanism, secondary clutch means on said output shaft for optionally coupling either of said sun gears thereto, and means operable to clutch the sun gear associated with said first planetary mechanism to said second planetary mechanism.

2. In combination, an input shaft, an axially alined output shaft, a pair of axially spaced planetary gear mechanisms each including sun gears rotatably mounted about said output shaft, clutch means for coupling said input shaft either directly to said output shaft or to one of said planetary gear mechanisms, clutch means on said output shaft for optionally clutching either of said sun gears thereto, and means operable to clutch the sun gear of said one planetary gear mechanism to the other planetary gear mechanism.

3. In a step-up gear housing of generally annular shape, a pair of axially spaced internal ring gears secured in said housing, planetary pinions and spiders associated therewith, an input shaft extending axially into one side of said housing, an output shaft extending axially out of the other side of said housing and journalled at its inner end in said input shaft, sun gears for each of said planetary gear mechanisms disposed in axially spaced relation and rotatable about said shaft, clutch means associated with each of said shafts, one of said clutch means being operative for selectively effecting direct drive between said shafts or drive through one of said planetary mechanisms, and the other of said clutch means being operative for selectively coupling said output shaft to either of said sun gears.

4. In planetary step-up gearing including an annular housing having axially spaced fixed internal ring gears therein, a series of planetary pinions meshing with each of said ring gears, planet spiders for each series of pinions, a sun gear driven by each series of pinions, an output shaft extending within said sun gears and rotatable independently thereof, a coaxial input shaft having means for selectively clutching it to said output shaft or to one of said planet spiders, clutch means operable from an inoperative position to a position to clutch the sun gear associated with said one planet spider to the other planet spider, and sliding clutch means on said output shaft operable in either direction from a neutral position to selectively clutch either of said sun gears to said output shaft.

5. In combination, an input shaft, having a clutch tooth portion, a coaxial output shaft journalled at one end in said input shaft and having an adjacent clutch tooth portion, a sliding clutch sleeve operable in one position to engage both clutch tooth portions to couple said shafts for direct drive, a planetary gear mechanism about said output shaft, the planet spider thereof having a clutch tooth portion, means for shifting said clutch sleeve axially to a position coupling said input shaft to said spider and releasing said output shaft, a second planetary gear mechanism about said output shaft, a sun gear in said first mechanism journalled on said output shaft and having an axial extension through said second mechanism, clutch means on said output shaft for coupling said sun gear to said shaft, clutch means on said sun gear intermediate said mechanisms for clutching said sun gear to the planet spider of said second mechanism, and a sun gear for said second mechanism journalled on the extension of said first sun gear, said output shaft clutch means being selectively operable to release said first sun gear and to clutch said second sun gear to said output shaft.

6. In combination, a shaft, a pair of axially spaced planetary gear mechanisms rotatable about said shaft, means for driving one of said gear mechanisms, a sun gear in said mechanism having an axial extension through the second mechanism and including an external clutch tooth portion intermediate said mechanisms and an internal clutch tooth portion at the end of said extension, a sun gear in the second mechanism journalled about the first sun gear extension and having an internal clutch tooth portion spaced axially from that of said first sun gear, a sliding clutch sleeve splined on said shaft having a clutch portion selectively shiftable into engagement with the clutch tooth portions of said sun gears, and means on said external portion of said first sun gear for clutching it to the planet spider of said second mechanism.

ROBERT E. BURRUS.

REFERENCES CITED

The following references are of record in the file of this patent:

UNITED STATES PATENTS

| Number | Name | Date |
| --- | --- | --- |
| 443,259 | Pedersen | Dec. 23, 1890 |
| 1,217,427 | Fast | Feb. 27, 1917 |
| 1,432,195 | Walker | June 1, 1920 |
| 1,470,947 | Tyler | Oct. 16, 1923 |
| 1,639,680 | Acker | Aug. 23, 1927 |
| 1,645,371 | Carey | Oct. 11, 1927 |
| 2,194,823 | Dooley | Mar. 26, 1940 |
| 2,214,485 | Short | Sept. 10, 1940 |
| 2,230,604 | Ware | Feb. 4, 1941 |

FOREIGN PATENTS

| Number | Country | Date |
| --- | --- | --- |
| 660,902 | France | Feb. 26, 1929 |